United States Patent [19]

Paton et al.

[11] 3,723,630

[45] Mar. 27, 1973

[54] METHOD FOR THE PLASMA-AC REMELTING OF A CONSUMABLE METAL BAR IN A CONTROLLED ATMOSPHERE

[76] Inventors: Boris Evgenievich Paton, ulitsa Kotsjubinskogo, 9, kv. 21, Kiev; Alexandr Ivanovich Tselikov, ulitsa Chernyakhovskogo, 40, kv. 54, Moscow; Viktor Iosifovich Lakomsky, ulitsa Bastionnaya, 10, kv. 30, Kiev; Georgy Mikhailovich Grigorenko, ulitsa Frolovskaya, 1, kv. 5, Kiev; Oleg Semenovich Zabarilo, ulitsa Chapaeva, 2/16, kv. 3, Kiev; Gary Alexandrovich Melnik, ulitsa Prazhskaya, 3, kv. 169, Kiev; Nikolai Alexeevich Ponomarev, ulitsa Truda, 34, kv. 18, Izhevsk; Emily Vladimirovich Verkhovtsev, ulitsa Orzhonikidze, 28, kv. 9, Izhevsk; Sergei Panteleevich Bakumenko, ulitsa Sovetskaya, 21, kv. 17, Izhevsk, all of U.S.S.R.

[22] Filed: June 28, 1971

[21] Appl. No.: 157,262

[52] U.S. Cl. ................................13/1, 13/9, 13/18
[51] Int. Cl. ............................H05b 7/00, H05b 7/18
[58] Field of Search ..........13/9, 1, 31, 18; 219/121 P

[56] References Cited

UNITED STATES PATENTS 3,105,864   10/1963   Robinson ..................................13/9
3,496,280   2/1970   Dukelow et al. ..............219/121 P X

*Primary Examiner*—Roy N. Envall, Jr.
*Attorney*—Holman & Stern

[57] ABSTRACT

A method for plasma-arc remelting of a material under a controlled atmosphere consists in making the material to be remelted in the form of a consumable hollow electrode-bar and electrically melting down the hollow electrode-bar so formed, in a cooled mold before finally stripping the remelted ingot off the mold. The method also includes generating a low temperature plasma at a tip of the consumable electrode which is connected to a power source, by supplying plasma-generating gas into an arc-region, through the hollow of the consumable electrode bar. Stabilizing the plasma-arc during operation without giving rise to transient arc plasma is expediently achieved by feeding preselected amounts of flux into the arc-region, thereby producing an ingot free from flaws and impurities.

2 Claims, 1 Drawing Figure

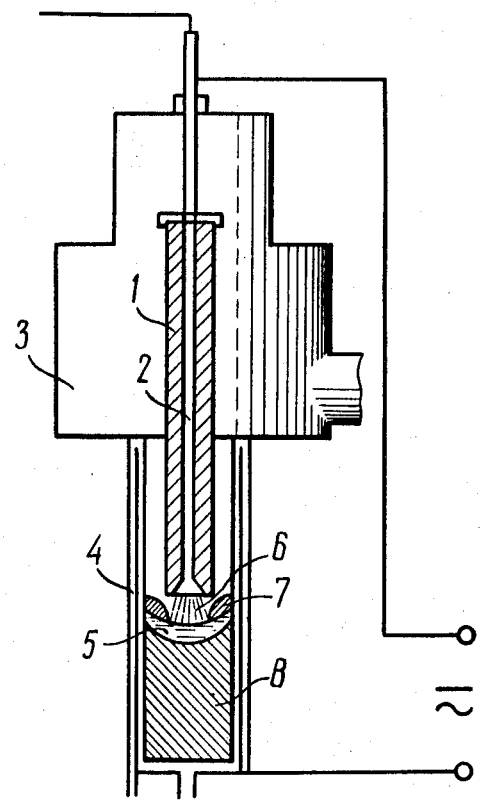

METHOD FOR THE PLASMA-AC REMELTING OF A CONSUMABLE METAL BAR IN A CONTROLLED ATMOSPHERE

BACKGROUND OF THE INVENTION

1. Field of the Invention

The present invention relates to electrical metallurgy and is directed to the production of ingots of clean metals, high-quality steels and alloys in electric furnaces.

2. Description of the Prior Art

Hitherto, the most commonly used method for that purpose has been the method of vacuum arc remelting. With the above process a free-burning electric arc is used as a source of heat and melt the metal which is protected from any harmful effect of atmosphere by using vacuum.

However, inherent in the foregoing method is a series of drawbacks. Thus, in remelting the alloys comprising the alloying constituents such as manganese characterized by a high vapor pressure, they tend to volatilize with ensuing deterioration in the alloy composition. Besides, by using the above technique treatment of the liquid metal with gases or/and fluxes is impracticable.

Known in the prior art is also a procedure for the plasma-arc remelting of metal which is in the form of a consumable metallic bar under controlled atmosphere conditions in which an ingot is formed in a cooled mould connected to a power source (see FRG Patent application No. P. 17 58 483.7).

With this production method a direct-acting arc plasmatron acts as heat source and transmission of heat to the metal is effected mostly by a stream of hot gas with the plasma arc zone located above the mould which is equipped with the ingot stripping gear.

By using the foregoing procedure the occurence of selective vaporization of the alloying elements can be avoided by controlling the working pressure in a melting chamber. Furthermore, the possibility of employing various gas media allows the metallurgical reactions to be controlled.

Yet, this method also is associated with of shortcomings.

The plasmatrons, provided by the aforesaid technique, are intricate in design and are expensive. Moreover, characteristic of them is low effective thermal efficiency by virtue of which they require very large amounts of gas for operation.

Since with the above procedure the arc zone is located above the mould this results, on the one hand, in heavy losses of heat due to radiation required for heating the walls of the furnace melting chamber and, on the other hand, in a need for a high priced and intricate mould fitted with the ingot stripping gear.

SUMMARY OF THE INVENTION

It is an object of the present invention to develop a method for the plasma-arc of a metal or an alloy in the form of a consumable bar under controlled atmosphere conditions which would enable a more simple construction of a plasma-arc furnace, a higher efficiency and a lower consumption of a plasma-generating gas.

Proposed herewith is a method for the plasma-arc remelting of a metal of an alloy in the form of a consumable metal bar in a controlled atmosphere in which an ingot is formed in a cooled mould connected an electric power supply. According to the present invention, a hollow bar is manufactured and placed in the mould whereupon between the face of the bar, through which an electric current flows, and a metal bath a low-temperature (arc) plasma is generated by feeding the plasma-generating gas through the hollow bar with the plasma arc zone being gradually shifted upwards as the bar is being flashed off.

As an additional means to further improve the stability of an arc plasma, it would be expedient to feed flux in the plasma arc zone.

As a result of the present invention a method has been established for the plasma-arc remelting of a consumable metal bar under controlled atmosphere conditions which would make it possible to simplify the construction of a plasma-arc furnace, ensure a substantial reduction in its cost, increase the furnace efficiency and reduce the consumption of the plasma-generating gas.

BRIEF DESCRIPTION OF DRAWING

To make the present invention more clear given below is an exemplary embodiment and the drawing which is a diagrammatic representation of the furnace (in longitudinal section) for carrying into production the plasma-arc remelting method in conformity to the present invention.

DESCRIPTION OF EMBODIMENT

Placed inside of solid-bottom copper cooled mould 4, coaxially with it, is consumable metal bar 1 with internal longitudinal cavity 2 contained in the furnace chamber. Either a D.C. or A.C. current is supplied to bar 1 and mould 4. The furnace chamber 3, on being initially evacuated, is then filled up with a plasma-generating gas. In mould 4, interior between the lower face of bar 1 and liquid metal bath 5 plasma is generated. Besides, passed through cavity 2 in bar 1 is the plasma-generating gas which may be either inert or active with respect to the metal being remelted, and the gas may be argon, gelium, nitrogen or hydrogen.

Low-temperature (arc) plasma 6 is steadily generated between the lower face of bar 1 and liquid metal bath 5.

Both the melting of bar 1 and maintaining liquid metal bath 5 is effected owing to the heat generated in the arc regions adjacent to electrodes, radiation of the arc column and a stream of hot gas.

As bar 1 is being flashed off, the arcing zone of arc plasma 6 is displaced upwards, the rate of this travel being controlled by changing the speed at which bar 1 is fed.

Control of the gas atmosphere can be accomplished by varying both the composition of a plasma-generating gas and the pressure values in the furnace chamber 3.

In order to facilitate ionization of the gas contained in the space between the lower face of bar 1 and metal bath 5, eliminating thereby the possibility of generating transient arc plasma, i.e., in order to make the plasma more stable, flux 7 is fed onto the surface of metal bath 5 containing readily ionizing substances and this forms a slag. At the same time the flux 7 is intended for refining the metal. Ingot 8 is formed in mould 4 fitted with a solid bottom.

The proposed procedure has been employed efficiently for remelting steel bars in a water-cooled copper mould. The remelting process has been effected by operating on both a D.C. and A.C. currents in the atmosphere made up of argon and nitrogen or of a mixture of argon with either nitrogen or hydrogen and with flux fed on the metal bath.

The trial heats have proved high stability of arc plasma. Besides, consumption of a plasma-generating gas has been reduced by some 20–25 percent and power input — by 10 to 15 percent compared to the conventional technique of plasma-arc remelting.

When compared with the vacuum arc remelting process, power input has been decreased by 20 to 25 percent.

The surface of the ingots fabricated has been smooth, blow holes have been absent.

We claim:

1. A method for plasma-arc remelting of a metal or alloy which is in the form of a consumable bar, under controlled atmospheric conditions, comprising: making said metal or alloy in the form of a hollow consumable bar; movably setting up the hollow bar to dip in a cooled mould in which an ingot of the material of the consumable bar is to be formed; connecting an electrical power supply source between said hollow metal bar and the mould body so as to flash an arc therebetween; delivering a plasma-generating gas through the hollow bar into a space at the end of the bar which dips into the mould so as to generate in said space a low temperature plasma; and shifting of the plasma-arc-zone upwards as the bar melts down and is slowly consumed to shape the material of the hollow bar into the mold.

2. A method as claimed in claim 1 which includes the steps of feeding plasma flux material into the plasma arc zone and eliminating formation of transient arc plasma in order to stabilize the arc in said space at said end of the bar.

* * * * *